(12) United States Patent
Alfonso

(10) Patent No.: US 12,217,355 B1
(45) Date of Patent: Feb. 4, 2025

(54) SYSTEMS AND METHODS FOR OPTIMIZED STREAMING OF THREE-DIMENSIONAL CONTENT

(71) Applicant: Illuscio, Inc., Culver City, CA (US)

(72) Inventor: Pedro Alfonso, Austin, TX (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/412,666

(22) Filed: Jan. 15, 2024

(51) Int. Cl.
| | |
|---|---|
| G06T 15/20 | (2011.01) |
| G06T 9/00 | (2006.01) |
| G06T 17/20 | (2006.01) |
| G06T 19/00 | (2011.01) |
| H04L 65/613 | (2022.01) |
| H04L 65/80 | (2022.01) |

(52) U.S. Cl.
CPC ............... G06T 15/20 (2013.01); G06T 9/00 (2013.01); G06T 17/20 (2013.01); G06T 19/00 (2013.01); H04L 65/613 (2022.05); H04L 65/80 (2013.01); G06T 2200/16 (2013.01); G06T 2210/56 (2013.01)

(58) Field of Classification Search
None
See application file for complete search history.

(56) References Cited

U.S. PATENT DOCUMENTS

2017/0287205 A1* 10/2017 Makinen ................ G09G 5/006
2022/0095001 A1* 3/2022 Harviainen ........ H04N 21/6587

OTHER PUBLICATIONS

Thomas Forgione, Axel Carlier, Geraldine Morin, Wei Tsang Ooi, Vincent Charvillat, Praveen Kumar Yadav, "DASH for 3D Networked Virtual Environment", Oct. 26, 2018, ACM, MM '18: Proceedings of the 26th ACM international conference on Multimedia, pp. 1910-1918.*

Thomas Forgione, "Dynamic Adaptive 3D Streaming over HTTP", Nov. 29, 2019, University of Toulouse, PHD Thesis.*

Stefan Lederer, Christopher Mueller, Christian Timmerer, Hermann Hellwagner, "Adaptive Multimedia Streaming in Information-Centric Networks", Nov. 24, 2014, IEEE, IEEE Network, vol. 26, issue 6, pp. 91-96.*

(Continued)

*Primary Examiner* — Robert Bader
(74) *Attorney, Agent, or Firm* — Ansari Katiraei LLP; Arman Katiraei; Sadiq Ansari

(57) ABSTRACT

A three-dimensional (3D) streaming system and associated methods optimize 3D content streaming to remote devices by receiving 3D data that is distributed across a 3D space. The system partitions the 3D space into different regions, and compresses a different subset of the 3D data that is within each partitioned region as a separate compressed file. The system receives a request for a particular field-of-view in the 3D space and streams a set of compressed files that contain the different subset of 3D data for a set of the partitioned regions within the particular field-of-view. In response to a request for an updated field-of-view with a region that is not within the particular field-of-view, the system selects the compressed file that contains the 3D data within that region and streams the selected compressed file in response to the request for the updated field-of-view.

20 Claims, 9 Drawing Sheets

(56) References Cited

OTHER PUBLICATIONS

Jean-Philippe Farrugia, Luc Billaud, Guillaume Lavoué, "Adaptive streaming of 3D content for web-based virtual reality: an open-source prototype including several metrics and strategies", Jun. 2023, ACM, MMSys '23: Proceedings of the 14th Conference on ACM Multimedia Systems, pp. 430-436.*

Bo Han, Yu Liu, Feng Quian, "ViVo: Visibility-Aware Mobile Volumetric Video Streaming", Apr. 2020, ACM, MobiCom '20: Proceedings of the 26th Annual International Conference on Mobile Computing and Networking, Article No. 11, pp. 1-13.*

Jeroen van der Hooft, Tim Wauters, Filip De Turck, Christian Timmerer, Hermann Hellwagner, "Towards 6DoF HTTP Adaptive Streaming Through Point Cloud Compression", Oct. 2019, ACM, MM '19: Proceedings of the 27th ACM International Conference on Multimedia, pp. 2405-2413.*

Mohammad Hosseini, Christian Timmerer, "Dynamic Adaptive Point Cloud Streaming", Jun. 12, 2018, ACM, PV '18: Proceedings of the 23rd Packet Video Workshop, pp. 25-30.*

Feng Qian, Bo Han, Jarrell Pair, Vijay Gopalakrishnan, "Toward Practical Volumetric Video Streaming on Commodity Smartphones", Feb. 28, 2019, ACM, HotMobile '19: Proceedings of the 20th International Workshop on Mobile Computing Systems and Applications, pp. 135-140.*

Kyungjin Lee, Juheon Yi, Youngki Lee, Sunghyun Choi, Young Min Kim, "Groot: A Real-time Streaming System of High-Fidelity Volumetric Videos", Sep. 18, 2020, ACM, MobiCom '20: Proceedings of the 26th Annual International Conference on Mobile Computing and Networking, Article No. 57, pp. 1-14.*

* cited by examiner

SYSTEMS AND METHODS FOR OPTIMIZED STREAMING OF THREE-DIMENSIONAL CONTENT

BACKGROUND

Three-dimensional (3D) content may include a static 3D scene or an animation of 3D objects or scenes that move or change over time. The 3D content may be formed by points, polygons, or other primitives that are distributed in a 3D space. Due to the 3D nature of the 3D content and the distribution of the primitives across the 3D space, the 3D content typically has orders of magnitude more data than static 2D images or 2D animations, and file sizes ranging from hundreds of megabytes to gigabytes. The large file sizes make the 3D content impractical for streaming or real-time remote access over a data network as client devices wait several seconds before producing an initial render of a 3D scene or experience continual interruptions or buffering waiting for the 3D content of a 3D animation to be transferred.

DETAILED DESCRIPTION OF PREFERRED EMBODIMENTS

The following detailed description refers to the accompanying drawings. The same reference numbers in different drawings may identify the same or similar elements.

Provided are systems and associated methods for optimized streaming of three-dimensional (3D) content. The optimized streaming enables 3D content including static 3D scenes and 3D animations to be streamed in real-time over existing data networks to a remote client device seamlessly without buffering delays or multi-second startup times. Consequently, the remote client device may remotely access high quality and high resolution 3D content with an equivalent experience as remotely accessed two-dimensional (2D) content.

A 3D streaming system implements the optimized streaming by generating a tree-based representation for a point cloud, mesh model, or other 3D content. The nodes of the tree-based representation encode points, polygons, or other primitives in different regions of the 3D space spanned by the 3D content. The 3D streaming system compresses the nodes at different levels of the tree-based representation into different compressed files. In doing so, the 3D streaming system generates a partitioned and compressed representation of the 3D content with each generated file storing a fraction of the 3D content data and representing a different partitioned region in the 3D space of the 3D content.

The 3D streaming system receives a request for a particular field-of-view in the 3D space of the 3D content from a client device. The 3D streaming system selectively distributes the compressed files that contain the points, polygons, and/or other primitives for the partitioned regions within the particular field-of-view. The client device decompresses the compressed files, and renders the decompressed points, polygons, and/or other primitives for the regions in the particular field-of-view to present the particular field-of-view without waiting for the entirety of the 3D content to be streamed from the 3D streaming system. In other words, 3D streaming system streams the subset of compressed files that store the data for the partitioned regions that make up the requested field-of-view.

Figure 1:
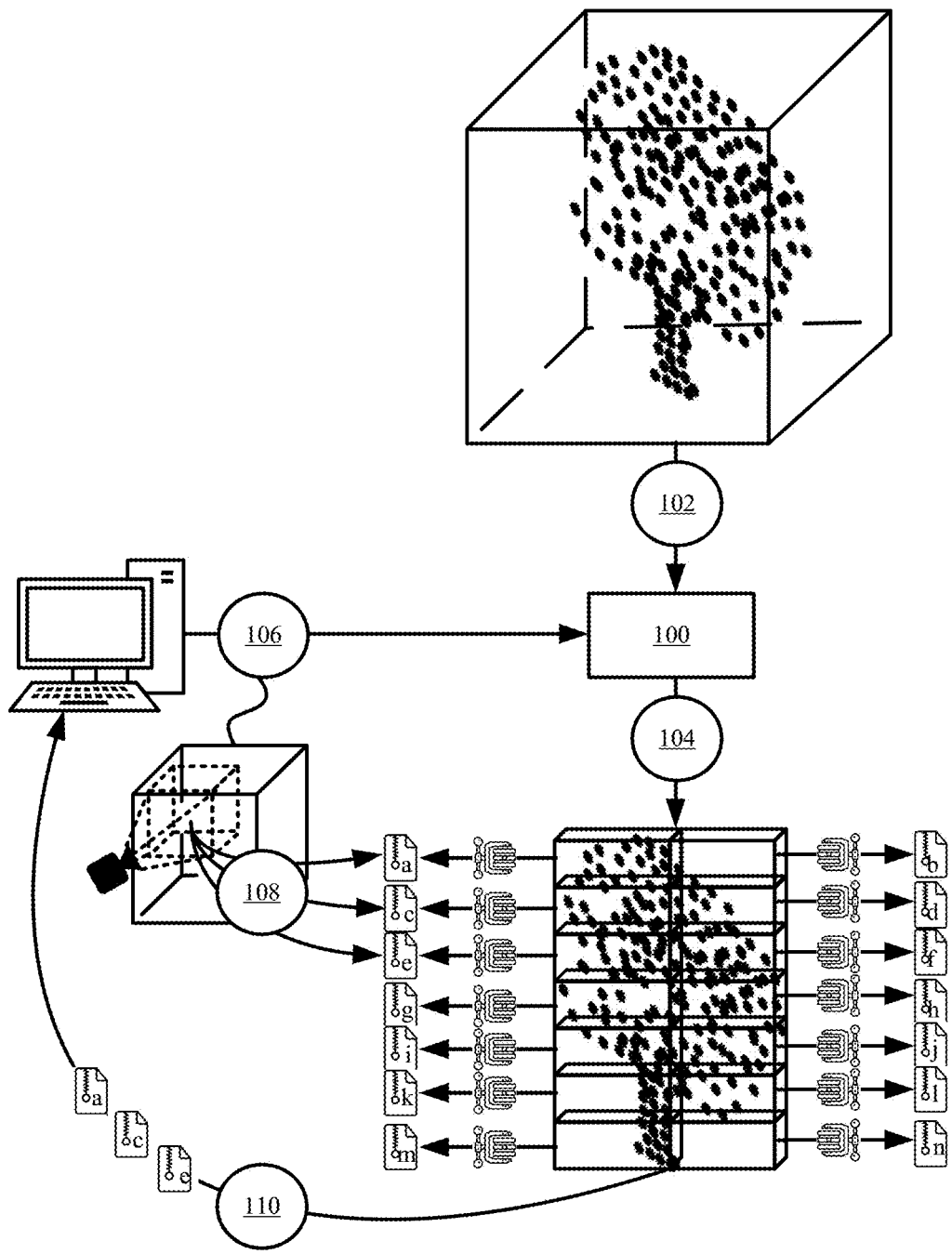
FIG. 1 illustrates an example of optimizing three-dimensional (3D) content streaming in accordance with some embodiments presented herein.

FIG. 1 illustrates an example of the optimized 3D content streaming in accordance with some embodiments presented herein. 3D streaming system 100 receives (at 102) a point cloud.

The point cloud may represent a 3D object or a 3D scene with points that are disconnected from one another and that are distributed in a 3D space to collectively generate the shape and visual characteristics of the 3D object or the 3D scene. In other words, the points are the primitives for constructing the 3D object or the 3D scene. Other 3D models or formats may use meshes or polygons as the primitives to generate the shape and visual characteristics of the 3D object or the 3D scene.

The points of the point cloud differ from pixels of a two-dimensional (2D) image, because certain regions of the point cloud may have no points, lower densities of points, and/or higher densities of points based on varying amounts of visual information that is defined, detected, or scanned at those regions. Additionally, the position of the point cloud points may be defined in a 3D space using x, y, and z coordinate values. In contrast, pixels of a 2D image are defined in 2D space and have a uniform density or fixed arrangement that is defined by the resolution of the 2D image. In other words, the point cloud points may have a non-uniform placement or positioning, whereas the 2D image may have pixel data for each pixel of a defined resolution (e.g., 640×480, 800×600, etc.).

The points of the point cloud also differ from meshes or polygons of a 3D mesh model in that the points are disconnected from one another, whereas the meshes or polygons are connected in order to create the shape or form of a represented 3D object. Moreover, the meshes or polygons may be stretched or skewed to change the overall shape of the represented 3D object, whereas the points are typically of a fixed size and/or shape.

Each point cloud point may be defined with a plurality of elements. The plurality of elements may include a first set of positional elements and a second set of non-positional or descriptive elements.

The positional elements may be defined with coordinates in a 3D space. For instance, each point cloud point may include x-coordinate, y-coordinate, and z-coordinate elements to capture the position of an imaged surface, feature, or article of the 3D object or the 3D environment in the 3D space.

The positional elements may also include a surface normal. The surface normal defines the angle, direction, or orientation that the surface, feature, or article of the 3D object or the 3D environment represented by the point cloud point faces or is exposed to. More specifically, the surface normal for a particular point is a line, ray, or vector that is perpendicular to the surface, feature, or article represented by that particular point.

The non-positional elements may include information about the detected characteristics of the surface, feature, or article imaged at a corresponding position in the 3D space. The characteristics may correspond to a detected color. The color may be represented using red, green, blue (RGB), and/or other values. In some embodiments, the characteristics may provide the chrominance, hardness, translucence, reflectivity, luminance, metallic characteristics, roughness, specular, diffuse, albedo, index of refraction (IOR), and/or other properties of the imaged surface, feature, or article. In some embodiments, the non-positional elements may directly identify a material property or other classification for a point. For instance, a first point may be defined with a non-positional element with a value that identifies the material property of "aluminum", a second point may be defined with a non-positional element with a value that identifies the material property of "steel", and a third point may be defined with a non-positional element with a value that identifies the material property of "plastic".

In some embodiments, the characteristics may be related to properties of the device used to generate each of the points. For instance, the characteristics may include a Tesla strength value to quantify the strength of the magnetic field that was used in detecting and/or imaging the surface, feature, or article represented by a particular point cloud point. In some embodiments, the non-positional elements may include energy, audio or sound, and/or other characteristics of the device or the object being imaged. Accordingly, the non-positional elements can include any property of the imaged surface, feature, or article (e.g., hue, saturation, brightness, reflectivity, etc.) or of the device used to capture the object part at a corresponding point in the 3D space.

Each point cloud point may include an array of elements. The array of elements may provide the positioning of the point in the 3D space as well as one or more characteristics of that point. For instance, a point cloud point may be stored and/or represented as an array of elements with some combination of x-coordinate, y-coordinate, z-coordinate, red, green, blue, chrominance, hardness, translucence, reflectivity, luminance, metallic characteristics, roughness, specular, diffuse, albedo, IOR, tesla, and/or other values.

The point cloud and the individual points of the point cloud may be generated by a 3D or depth-sensing camera, Light Detection and Ranging (LiDAR) sensor, Magnetic Resonance Imaging (MRI) device, Positron Emission Tomography (PET) scanning device, Computerized Tomography (CT) scanning device, time-of-flight device, and/or other imaging equipment for 3D objects, volumetric objects, or 3D environments. The point cloud may be generated from output of two or more devices. For instance, a first imaging device (e.g., a LiDAR sensor) may determine the position for each point in the 3D space, and a second imaging device (e.g., a high-resolution camera) may measure or capture the characteristics or other non-positional information for each point. One or more photogrammetry techniques may be used to consolidate the data from the first imaging device and the second imaging device, and to create the point cloud.

3D streaming system 100 compresses (at 104) the points or 3D data in different regions of the point cloud into separate compressed files. The size of each region may vary based on the number of points or density of points in that region. For instance, a first volume within the point cloud may be defined with 100 points, and a second volume within the point cloud that is the same size or that spans an equal amount of 3D space as the first volume in a different location of the point cloud may be defined with 1000 points. Accordingly, 3D streaming system 100 may compress (at 104) the first volume as a first compressed file, and may compress (at 104) the second volume as 10 compressed files with each of the 10 compressed files containing the data for a different set of 100 points from the 1000 points in the second volume. The amount of data contained within each of the compressed files and/or the size of each compressed file is optimized for streaming across a data network. For instance, the compressed file sizes may be equal to or less than the Maximum Transmission Unit (MTU) of the data packets or the maximum amount of data that may be transmitted with each data packet over the data network. In other words, 3D streaming system 100 may select the region size so that the amount of data that is compressed (at 104) in each region does not exceed a size threshold. The size threshold may be set according to a variety of criteria including maximum data packet sizes, the streaming protocol used to transfer the compressed files, the available resources and/or load on 3D streaming system 100 and/or the receiving client device, and other network and device factors that may impact the amount of data that may be transferred over a specific time from 3D streaming system 100 to the receiving client device. In some embodiments, 3D streaming system 100 uses Draco compression or another compression algorithm to compress (at 104) the 3D data in each partitioned region and to generate the compressed files.

In some embodiments, 3D streaming system 100 compresses (at 104) the points from two or more point clouds into a single compressed file. For instance, a 3D animation may be defined with a different point cloud for different frames of the 3D animation. 3D streaming system 100 may compress (at 104) the points within a requested region or field-of-view for different frames of the 3D animation and/or from different point clouds into the same compressed file.

3D streaming system 100 receives (at 106) a request to access the point cloud from a particular field-of-view. 3D streaming system 100 receives (at 106) the request from a remote client device over a data network. The particular field-of-view may be identified with coordinates in the 3D space of the point cloud, indices that correspond to different compressed regions of the point cloud, or other values for specifying the volume, region, coordinates, positions, or space of the point cloud to view.

3D streaming system 100 selects (at 108) the subset of compressed files that contain the data for the partitioned regions that are within or that form the particular field-of-view, and streams (at 110) the subset of compressed files over the data network to the remote client device. In some embodiments, the data within the subset of compressed files is self-contained meaning that the compressed files include the data that is needed to render a visualization of the particular field-of-view. For instance, the compressed files store the coordinates and visual characteristics for each point or primitive that is positioned in the particular field-of-view and/or that form the surfaces or visual features of the 3D content within the particular field-of-view. In some other embodiments, 3D streaming system 100 transmits metadata or other data in advance of the subset of compressed files. The metadata may provide the coordinate space or the 3D space spanned by the point cloud so that the positions defined for the points in the subset of compressed files may be correctly oriented or positioned. In some embodiments, 3D streaming system 100 may stream a manifest to the remote client device prior to streaming the subset of compressed files. The manifest may identify the compressed files that are defined for different regions in a 3D scene or different frames of an animation. In some such embodiments, the remote client device may reference the manifest to determine which compressed files to request for the particular field-of-view in the 3D scene or the different frames of the animation.

The remote client device receives the subset of compressed files. The remote client device decompresses the subset of compressed files in order to extract the coordinates and visual characteristics of the points or primitives that are defined in the regions within the particular field-of-view, and generates a visualization by rendering the uncompressed points or primitives.

In the example of FIG. 1, 3D streaming system 100 streams 3 of the 14 generated compressed files to satisfy the request and provide the remote client device with the data that is needed to render the particular field-of-view. 3D streaming system 100 does not send the remaining 11 compressed files that contain the point cloud data that is outside the particular field-of-view until that data is requested by the remote client device or the 3 compressed files for the particular field-of-view are completely transmitted to the remote client device.

In some embodiments, 3D streaming system 100 generates the compressed files that contain the data for primitives (e.g., points or polygons) in different regions of a 3D model and/or in different regions for different frames of a 3D animation from a tree-based representation of the 3D model or 3D animation. For instance, the primitives that are distributed in a 3D space of a point cloud, mesh model, or other 3D content may be arranged and represented by nodes of an octree, binary tree, K-dimensional (KD) tree, or other tree-based representation.

Figure 2:
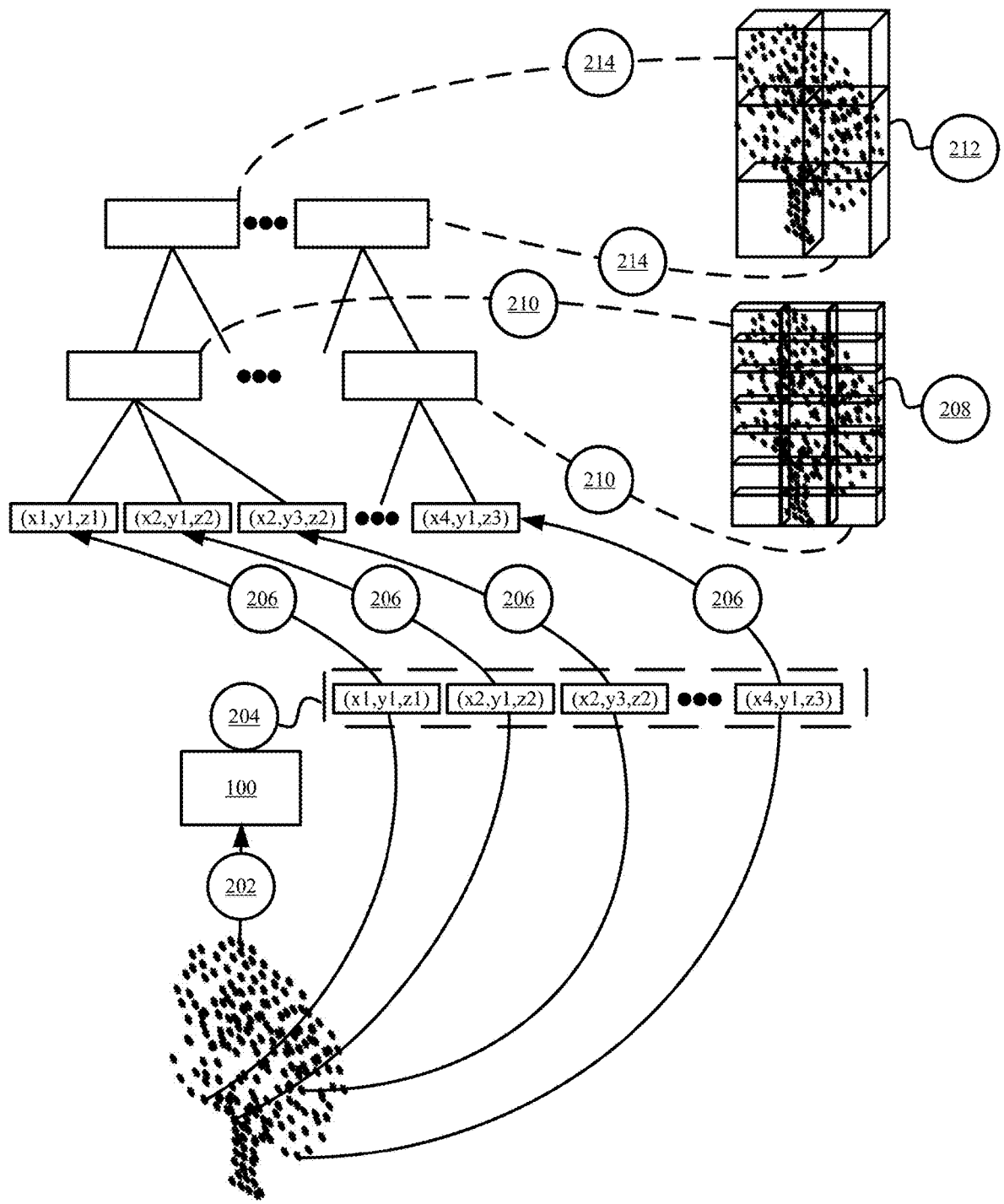
FIG. 2 illustrates an example of encoding a tree-based representation for 3D content in accordance with some embodiments presented herein.

FIG. 2 illustrates an example of encoding a tree-based representation for 3D content in accordance with some embodiments presented herein. 3D streaming system 100 obtains (at 202) the primitives that form or create the 3D content. The 3D content may correspond to a static 3D object or a static 3D scene, or may correspond to a 3D animation or 3D movie. The primitives may include points, triangles, polygons, or meshes that collectively create the 3D objects and/or the 3D scenes of the 3D content. The primitive data may include positional data such as x, y, and z coordinates for the positioning of each primitive in the 3D space spanned by the 3D content. The primitive data may also include non-positional data including color values and/or other visual characteristics for each primitive. Multiple primitives may be defined at the same position in the 3D space for different frames of a 3D animation. The primitives may be defined with different color values and/or with time values that indicate which one or more frames of the animation the primitives belong to or the times or frames within the 3D animation at which those primitives are to be rendered.

3D streaming system 100 organizes (at 204) the primitives based on the positional data, non-positional data, and/or relationships or commonality amongst the primitives. For instance, 3D streaming system 100 may organize (at 204) the primitives based on increasing coordinate values or positional data.

3D streaming system 100 defines (at 206) the leaf nodes of the tree-based representation according to the organization of the primitives. Each leaf node may represent or correspond to a different primitive of the 3D content or a partitioned region within the 3D space of the 3D content that includes one or more primitives with the data contained in the partitioned region not exceeding a threshold amount of data. Accordingly, the partitioned regions may be different sized volumes in the 3D space of the 3D content to ensure that each partitioned region contains an about equal amount of data or primitives despite the density of primitives changing across the 3D space of the 3D content. In some embodiments, the partitioned regions may be equal sized volumes that contain different numbers of primitives and different amounts of data. In some embodiments, each leaf node may include a pointer, index, or identifier to the primitive or partitioned region represented by the leaf node. For instance, a unique index value assigned to a particular leaf node may map or link to the primitives in a specific volume or partitioned region of the 3D content. In other words, the particular leaf node may store the coordinates and visual characteristics of the primitives in the specific volume or partitioned region of the 3D content or may store one or more values to identify the specific volume or partitioned region from which the primitives in that specific volume or partitioned region may be accessed.

3D streaming system 100 may add parent nodes for the primitives, volume, or region of space encompassed by two or more leaf nodes of the tree. For instance, 3D streaming system 100 may partition (at 208) the space that is spanned by the 3D content into equal sized cubes or other volumes of a first size. 3D streaming system 100 may then create (at 210) a parent node for each cube or volume of the first size, and may link a parent node to two or more leaf nodes based on the primitives represented by the two or more leaf nodes falling within the region or volume of space represented by the parent node or based on the partitioned regions of the two or more leaf nodes being encompassed by the cube, volume, or region spanned by the parent node. If a parent node or leaf node corresponds to an empty region of space (e.g., no primitives within the region, cube, or volume represented by that node), 3D streaming system 100 may cull or remove that node from the tree or may insert the node as an indicator for a region of empty space.

Each parent node, like each leaf node, is identified with a unique value, identifier, or index. In some embodiments, each parent node may be defined with coordinates for the region of the 3D content that is represented or spanned by that parent node. In some other embodiments, each parent node is defined with the unique values, identifiers, or indices for the leaf nodes or primitives that are directly or indirectly linked to that parent node. Therefore, a single parent node may link to the stored data in the partitioned regions or primitives of two or more leaf nodes or lower layer nodes in the tree, and the single parent node may encode more data that the children nodes linked to that single parent node.

3D streaming system 100 constructs (at 212 and 214) the tree with higher levels of nodes (e.g., grandparent nodes)

that represent cubes, volumes, or other regions of a size that is larger than the size of the lower-level nodes. 3D streaming system 100 may continue until the root node encompasses or spans the entirety of the 3D content or the entirety of the space spanned by the primitives of the 3D content.

In some embodiments, 3D streaming system 100 may generate the root node first, wherein the root node represents the entirety of the 3D content or the 3D space spanned by the 3D content primitives. 3D streaming system 100 may then subdivide the 3D content or the represented space into smaller regions or volumes, and may define children nodes based on the data or primitives within each of the partitioned regions or volumes. 3D streaming system 100 may subdivide the space into different sized regions based on a decreasing maximum amount of data or number of primitives that is to be included in the nodes at each lower layer of the tree.

In constructing a binary tree representation of the 3D content, 3D streaming system 100 may partition the represented region into two sub-regions, may define children nodes under the root node for each of the two sub-regions, and may continue subdividing each sub-region into two smaller sized sub-regions until the leaf nodes corresponding to the individual 3D content primitives are reached or each sub-region encompasses some number of primitives that collectively do not exceed the data threshold set for the leaf node layer of the binary tree.

In constructing an octree representation of the 3D content, 3D streaming system 100 may partition the entirety of the 3D content or the space spanned by the 3D content primitives into eight sub-regions, and may define children nodes under the root node for each sub-region. 3D streaming system 100 may continue subdividing each sub-region into eight smaller sub-regions, and may continue defining nodes for lower layers of the octree until the leaf nodes corresponding to the individual 3D content primitives are reached or each sub-region encompasses some number of primitives that collectively do not exceed the data threshold set for the leaf node layer of the octree.

To optimize the tree construction and reduce the potential for empty nodes in the tree and/or nodes encoding significantly different amounts of data or numbers of primitives, 3D streaming system 100 may construct a KD tree and may partition the particular region of 3D space spanned by a set of primitives into two or more equal or unequal sized volumes or sub-regions. The size and/or shape of each volume may be determined by the number of primitives, parent nodes, or children nodes that fall within that volume. For instance, 3D streaming system 100 may expand the size of a volume when the volume corresponds to an empty space or encompasses fewer than one child node or one primitive.

In any case, each node of the tree-based representation contains the data for one or more primitives in a given region of the 3D content space. 3D streaming system 100 generates the compressed files by selecting and compressing nodes from the tree-based representation that collectively cover or span the entirety of the 3D content space.

Figure 3:
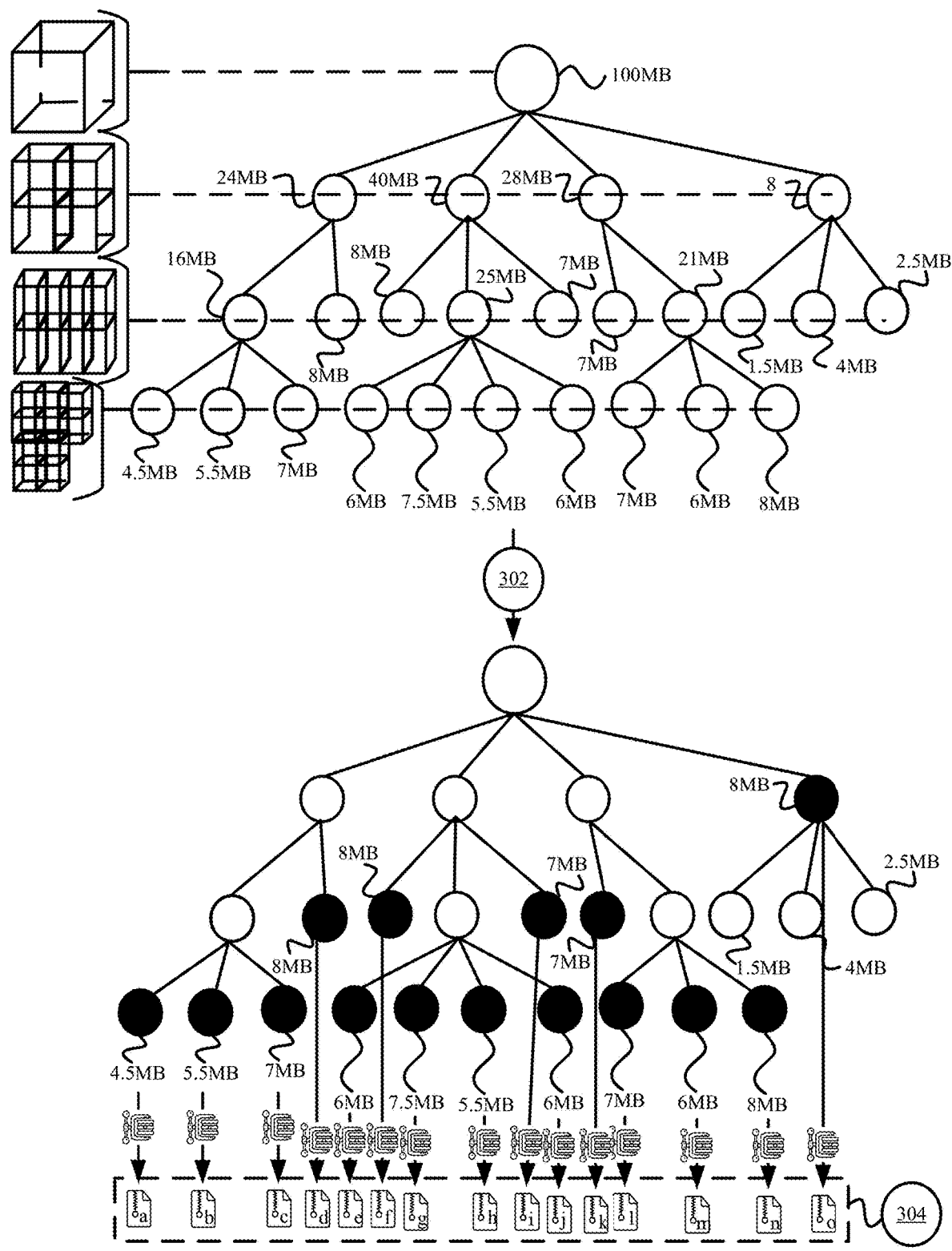
FIG. 3 illustrates an example of generating compressed files from a tree-based representation of 3D content in accordance with some embodiments presented herein.

FIG. 3 illustrates an example of generating the compressed files from the tree-based representation of 3D content in accordance with some embodiments presented herein. 3D streaming system 100 traverses (at 302) the tree-based representation to select nodes that contain an amount of data that is equal to or less than a threshold amount or that may be compressed down to be equal to or less than the threshold amount. For instance, the threshold amount may correspond to the MTU or the maximum amount of data that may be transferred in the payload of a single data packet (e.g., 1,500 bytes). In some embodiments, the threshold amount may be larger (e.g., 300-500 kilobytes) to produce compressed files that are optimized for the streaming protocol used by 3D streaming system 100 and that are transferred in less time than compressed files with the smaller threshold amount.

Since the 3D content may contain different numbers of primitives in different regions, the nodes of the tree-based representation may contain different amounts of data. Accordingly, the selection of the nodes to compress may include selecting leaf nodes for dense regions of the 3D content, parent nodes directly linked to two or more leaf nodes for less dense regions of the 3D content, and/or nodes that are two or more layers above the leaf nodes for even less dense regions of the 3D content.

3D streaming system 100 compresses (at 304) each selected node to generate a compressed file. For instance, 3D streaming system 100 may use Draco compression on the primitives that are contained within each selected node or that are linked to each selected node in order to reduce the size of the compressed file relative to the uncompressed data contained by or linked to the selected node. In some embodiments, the compression yields a 5 to 10 times reduction in data.

A compressed file may be identified with the same value, identifier, or index as the node that was compressed to generate that compressed file. The value, identifier, or index may be used during decompression of the compressed file to identify where to insert the decompressed data when reconstructing the tree-based representation on the client device from the compressed files. The value, identifier, or index may also be used by 3D streaming system 100 to determine which compressed files to stream to a client device in order to provide the client device with the data that is needed to render a particular field-of-view rather than all of the 3D content or the compressed files sequentially. In other words, 3D streaming system 100 selectively distributes the compressed files to different client devices with only the regions of the 3D content that are currently being viewed by that client device and distributes additional compressed files for a changing field-of-view in real-time or as the field-of-view changes.

In some embodiments, 3D streaming system 100 generates and sends metadata to a client device prior to the client device requesting the 3D data for a particular field-of-view. In some such embodiments, the metadata may include a structure for the tree-based representation that is generated for a requested 3D content. The structure may identify the nodes at each layer of the tree-based representation and the region spanned by each node in each layer without providing the node data or the data for the primitives associated with the nodes. The client device may reference the metadata or tree structure to determine the nodes that contain the data for a desired field-of-view in the 3D space of the 3D content, and may issue requests that target those nodes. The requests may include the values, identifiers, or indices of the targeted nodes. 3D streaming system 100 may select the compressed files that were generated for the targeted nodes, and may stream the selected compressed files to the client files.

Figure 4:
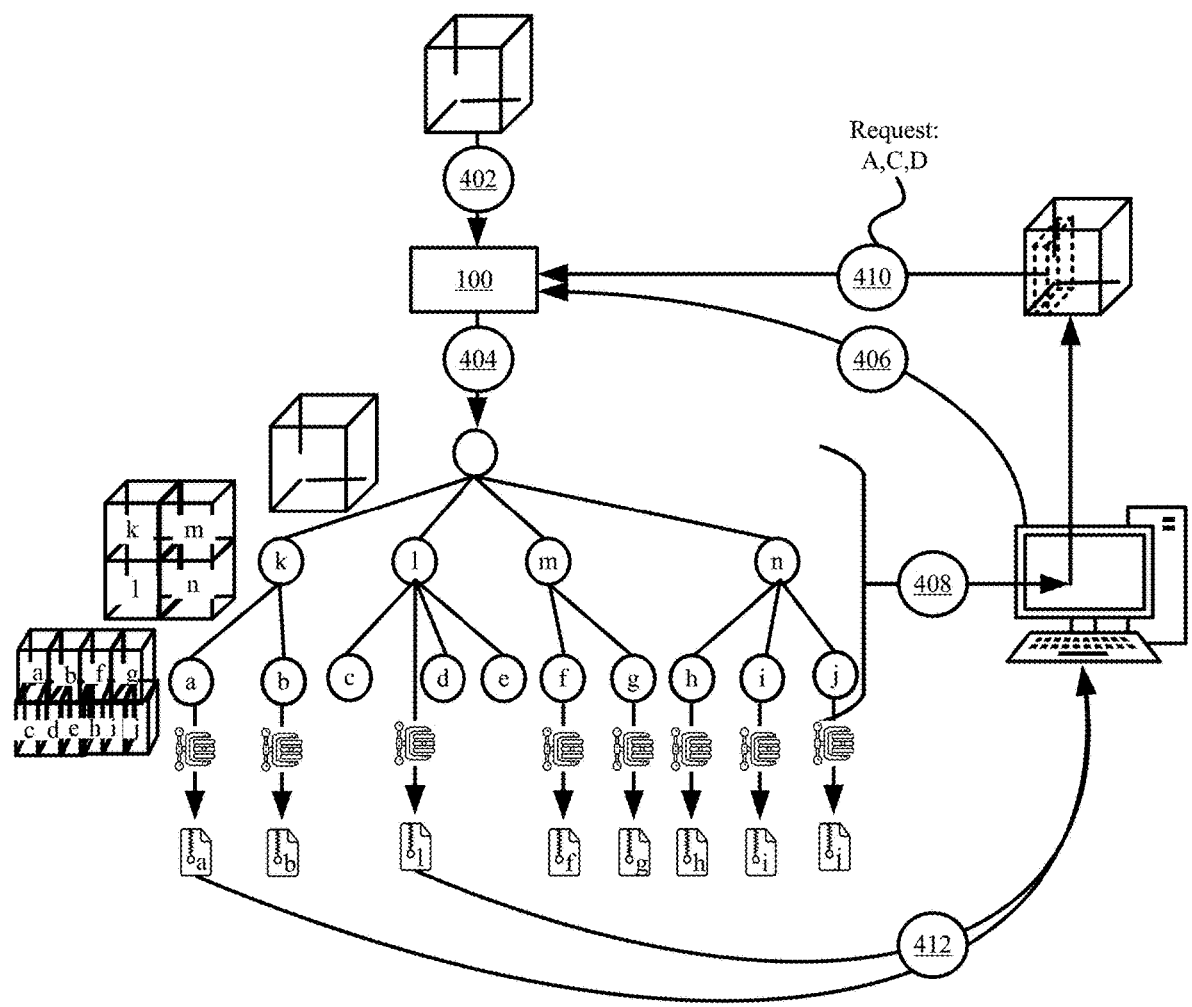
FIG. 4 illustrates an example of selectively streaming compressed files for 3D content by referencing a mapping for the partitioned space of the 3D content in accordance with some embodiments presented herein.

FIG. 4 illustrates an example of selectively streaming compressed files for 3D content by referencing a mapping for the partitioned space of the 3D content in accordance with some embodiments presented herein. 3D streaming system 100 receives (at 402) a 3D model, and defines (at 404) a tree-based representation for the 3D model with nodes at upper layers of the tree-based representation mapping to the data in larger-sized regions of the 3D model and with nodes at lower layers of the tree-based representation mapping to the data in smaller-sized regions of the 3D model.

3D streaming system 100 receives (at 406) a request to access the 3D content from a remote client device. 3D streaming system 100 distributes (at 408) the tree-based representation to the remote client device. The tree-based representation contains a mapping of the partitioned regions of the 3D content.

The remote client device references the mapping to determine which partitioned regions to request in order to generate an initial field-of-view. The remote client device issues (at 410) requests for the primitive data in the selected partitioned regions or that are contained or associated with nodes that span the selected partitioned regions.

3D streaming system 100 receives (at 412) the requests, and determines that the data or primitives for a first requested region or node is contained within a first compressed file and that the data or primitives for second and third requested regions or nodes are contained within a second compressed file. For instance, the amount of data contained within the second and third requested regions or nodes may be less than a threshold amount such that 3D streaming system 100 combines the data from the second and third requested regions or nodes into the second compressed file. 3D streaming system 100 streams (at 412) the first compressed file and the second compressed file to the remote client device.

The remote client device extracts the primitive data for the first, second, and third requested regions from the first and second compressed files. The remote client device renders the extracted primitive data to generate a 3D visualization of the 3D surfaces, objects, or features that are within the first, second, and third regions of the 3D model.

3D streaming system 100 may adapt the tree-based representation definition and the compressed file generation for 3D content that involves an animation, motion, or video. For instance, to generate a tree-based representation for a 3D animation, 3D streaming system 100 may select a first frame of the 3D animation, partition the 3D space spanned by the first frame into different sized regions, and may define nodes of tree-based representation as if the first frame was a static 3D object or scene. For a second frame of the 3D animation, 3D streaming system 100 may partition the 3D space spanned by the second frame into the same different sized regions as the partitioning of the first frame, and may compare the 3D data (e.g., points, polygons, primitives, etc.) in each partitioned region of the second frame to a corresponding partitioned region of the first frame for positional or visual (e.g., color) change. If no change is detected in a particular region, 3D streaming system 100 may leave the nodes defined for the particular region unchanged or may not define new nodes. If change is detected in the particular region, 3D streaming system 100 may define new nodes that contain the changed data or that contain the 3D data for the particular region in the second frame, and may append the newly defined nodes to the tree-based representation with a time element. The time element indicates that the newly defined nodes take effect at the time of the second frame and replace certain nodes that were defined for the first frame of the particular region.

Figure 5:
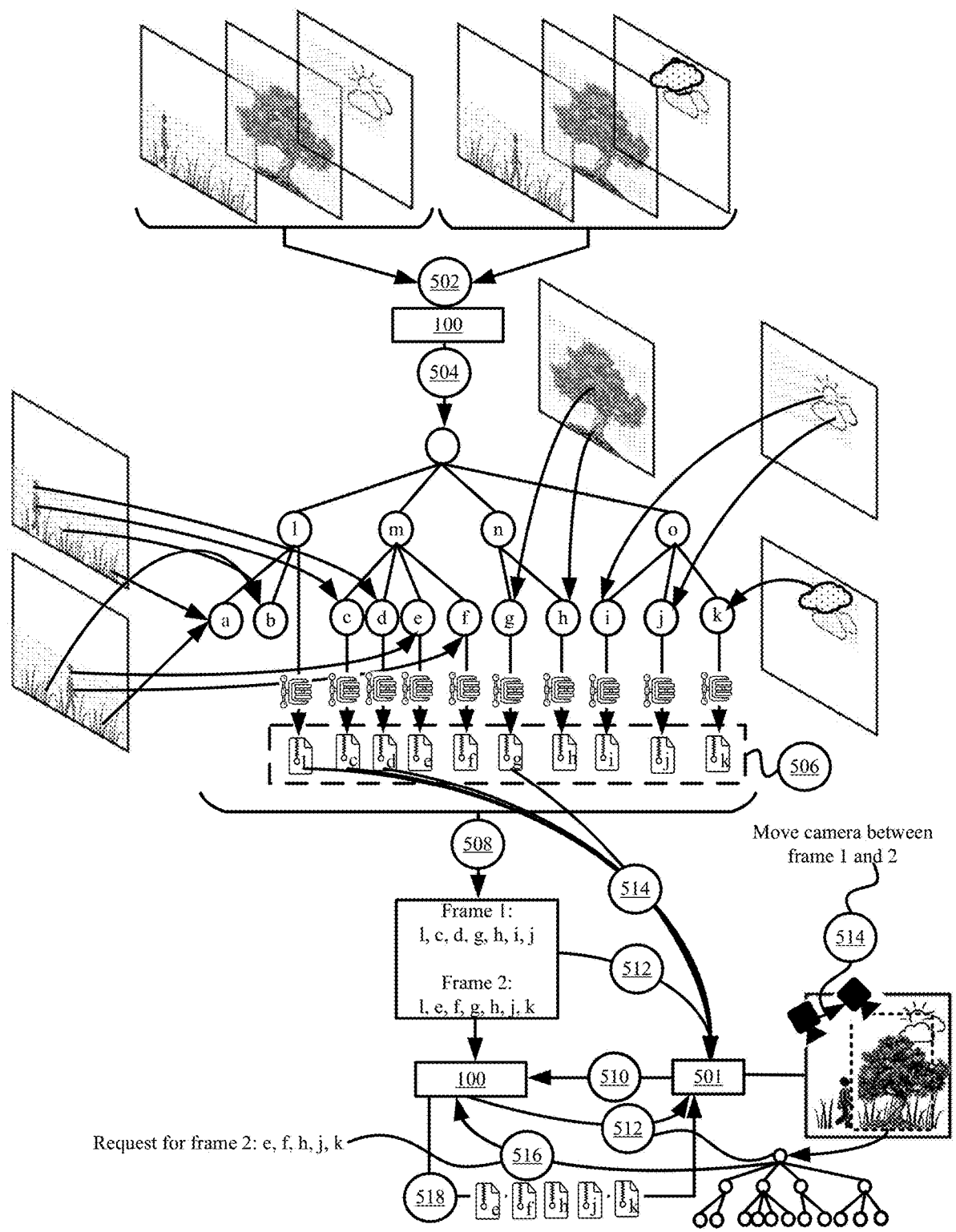
FIG. 5 illustrates an example of selectively streaming compressed files for a 3D animation in accordance with some embodiments presented herein.

FIG. 5 illustrates an example of selectively streaming compressed files for a 3D animation in accordance with some embodiments presented herein. 3D streaming system 100 receives (at 502) a 3D animation. The 3D animation may be defined as multiple point clouds with each point cloud containing the 3D data for a different frame of the animation. Alternatively, the 3D animation may be defined as a single point cloud with points of the point cloud being defined with time elements that specify different frames of the animation at which the points are to be rendered.

3D streaming system 100 generates (at 504) a tree-based representation with nodes that represent the changing 3D data for different regions in different frames of the 3D animation. In some embodiments, each node is associated with a time value. The time value indicates the frames or time in the animation at which the data associated with the node is to be presented.

3D streaming system 100 generates (at 506) the compressed files based on the nodes of the tree-based representation. For a static region of the 3D animation that does not change between different frames of the animation, 3D streaming system 100 may generate (at 506) a single compressed file and the data in that single compressed file may be reused to present the static region in the different frames of the animation. Moreover, 3D streaming system 100 may generate (at 506) the compressed files for nodes at different layers of the tree-based representation based on the amount of data contained within the layers. For instance, rather than create two separate compressed files for nodes labeled "a" and "b" in FIG. 5, 3D streaming system 100 may generate a single compressed file for the parent node "1" of nodes "a" and "b" when the parent node "1" represents a larger region with data that does not exceed a size threshold for the generated compressed files.

3D streaming system 100 also generates (at 508) a manifest for the 3D animation. The manifest includes the identifiers or indices of the nodes that are rendered with each frame of the 3D animation or the identifiers or indices of the compressed files generated for those nodes. In some embodiments, the identifiers or indices for the nodes of the tree-based representation of the 3D animation may be the same as the identifiers or indices for the compressed files that are generated for those nodes. If there is no change between a first frame and a second frame of the 3D animation, then the entry for the second frame in the manifest may be empty (e.g., defined without any node indices). If one region represented by a particular node changes between a first frame and a second frame of the 3D animation, then the entry for the second frame in the manifest may contain an index for a node that contains either the changes occurring in that region between the second frame and the first frame or the primitives that are defined for that region in the second frame.

3D streaming system 100 receives (at 510) a request to view the 3D animation from client device 501. For instance, client device 501 may issue a request with the Uniform Resource Locator (URL) for accessing the 3D animation to 3D streaming system 100.

In response to the request, 3D streaming system 100 provides (at 512) the manifest to client device 501. In some embodiments, 3D streaming system 100 also provides (at 512) the metadata for the structure of the tree-based representation that was generated for the 3D animation to client device 501. For instance, if client device 501 is able to move a virtual camera in the 3D space of the 3D animation and/or change the field-of-view, then 3D streaming system 100 provides (at 512) the metadata along with the manifest to client device 501 so that client device 501 may request only the nodes or compressed files that are within the custom field-of-view for the current frame of the animation. In this example, the 3D animation may be a virtual reality, mixed reality, or augmented reality presentation in which movements of the user head or eyes change the field-of-view and the 3D objects or 3D scenes that are presented at different times of the 3D animation based on the positioning of those 3D objects or 3D scenes relative to the field-of-view and the time in the 3D animation.

In some embodiments, 3D streaming system 100 may also stream (at 514) a set of compressed files for presenting a first frame of the animation from an initial or default field-of-view. For instance, 3D streaming system 100 may initially stream compressed files labeled 1, c, d, and g so that client device 501 may render the first frame of the 3D animation with the 3D character, part of the grass, and part of the tree in the initial field-of-view. Client device 501 decompresses the received compressed files, extracts the stored primitive data (e.g., points, meshes, polygons, etc.) from the compressed files, and renders the extracted primitives at positions defined in the positional elements of the primitives and with visual characteristics (e.g., color values) defined in the non-positional elements of the primitives.

Client device 501 may track (at 516) changes to the initial or default field-of-view or may receive user input that specifies a new current field-of-view. In any case, client device 501 references the metadata and the manifest to determine the nodes that form the field-of-view for the next frame in the animation. For instance, if the field-of-view changes between the first frame and the second frame of the 3D animation to include regions represented by nodes or compressed files with the identifiers or indices 1, e, f, g, h, j, and k, then client device 501 requests (at 518) the compressed files that are generated for those nodes or the compressed files for the nodes that were not previously received and/or used to render the first frame of the 3D animation (e.g., compressed files with the identifiers or indices "e", "f", "h", "j", and "k"). In other words, 3D streaming system 100 does not redundantly stream the same compressed files for different frames of the 3D animation. Instead, 3D streaming system 100 streams (at 518) the compressed files for nodes that have changes or that were not previously streamed to client device 501 (e.g., compressed files with the identifiers or indices "e", "f", "h", "j", and "k").

If the current field-of-view does not change between the first frame and the second frame of the 3D animation, remote device 501 may nevertheless request the compressed files for the regions or nodes that change in the field-of-view between the first frame and the second frame. As shown in FIG. 5, the initial field-of-view for the first frame includes a 3D character walking across a grass field. The primitives or 3D data for the grass field is contained within the compressed file labeled "1" and the primitives or 3D data for the position of the 3D character in the first frame is contained within the compressed files labeled "c" and "d". If the field-of-view stays the same as the animation continues, remote device 501 determines, from the manifest, that the grass field does not change and that the primitives or 3D data from the compressed file labeled "1" may be reused for the second frame. However, the 3D character moves between the first frame and the second frame and the manifest identifies that compressed files labeled "e" and "f" are required to update or animate the 3D character between the first frame and the second frame.

In some embodiments, client device 501 includes a cache that stores the compressed files or uncompressed nodes from previously rendered frames of the 3D animation. Client device 501 may query the cache to determine if compressed files or uncompressed nodes for a current frame of the 3D animation are stored in the cache, and reuses those compressed files or uncompressed nodes from the cache instead of requesting them again from 3D streaming system 100.

In some embodiments, client device 501 enters compressed files or uncompressed nodes for the field-of-view of the current frame of the 3D animation in a buffer. The compressed files or uncompressed nodes entered into the buffer may be obtained from the local cache and/or may be streamed by 3D streaming system 100 to client device 501. Client device 501 may render the field-of-view for the current frame of the 3D animation based on the uncompressed data that is within the client device buffer. In some embodiments, the buffered data may be used to generate frames of the 3D animation should the bandwidth quality decrease. For instance, the buffered data may be rendered at one time to generate each frame of the 3D animation once. The buffering avoids a "just-in-time" approach in which data is partially presented as it is received which may result in the frames being presented with continually changing quality levels.

Figure 6:
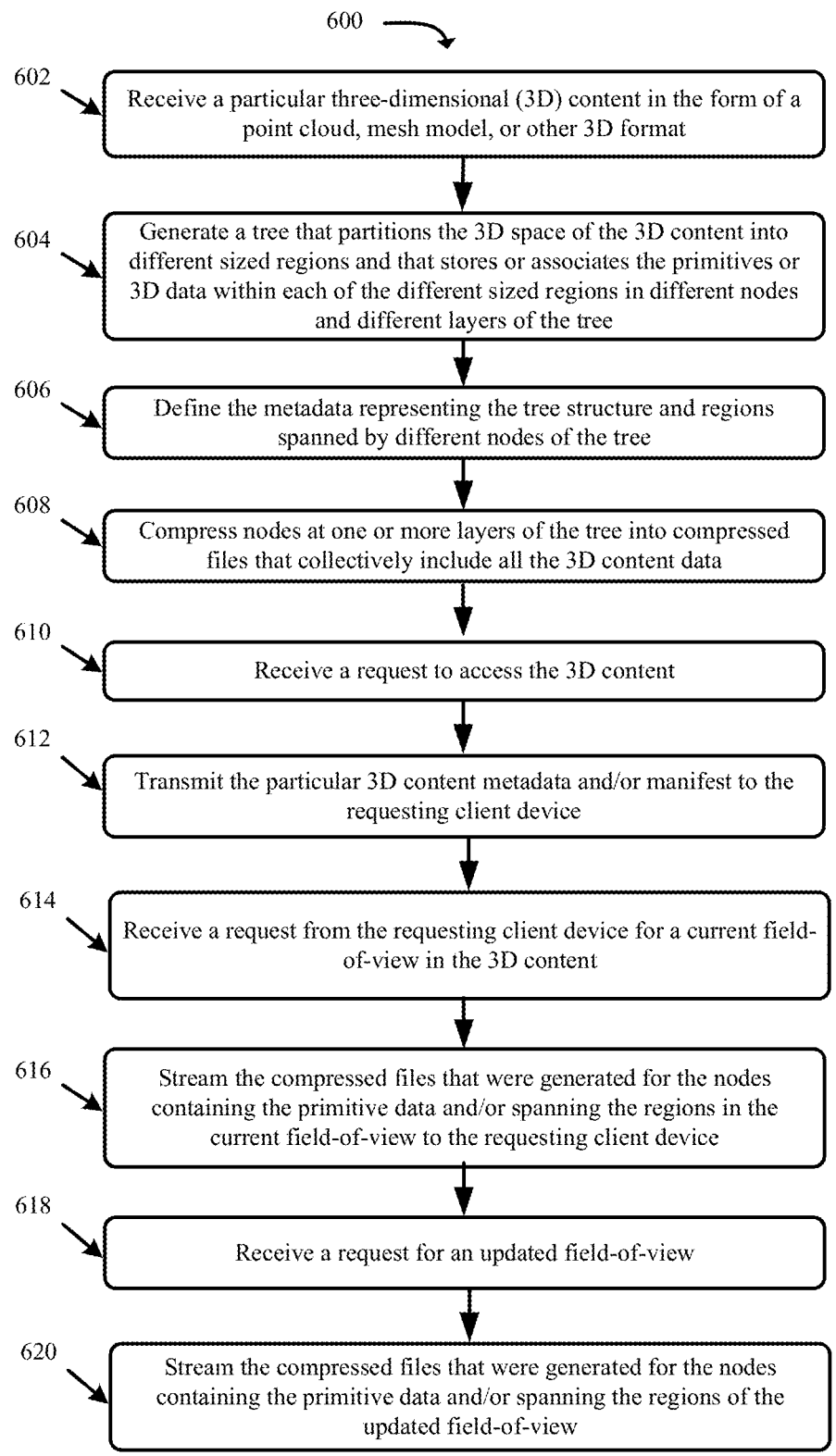
FIG. 6 presents a process for optimized streaming of 3D content over a data network in accordance with some embodiments presented herein.

FIG. 6 presents a process 600 for optimized streaming of 3D content over a data network in accordance with some embodiments presented herein. Process 600 is implemented by 3D streaming system 100. 3D streaming system 100 includes one or more devices or machines with processor, memory, storage, network, and/or other hardware resources for the generation and streaming of 3D content to remote devices that access 3D streaming system 100 for the 3D content.

Process 600 includes receiving (at 602) a 3D content in the form of a point cloud, mesh model, or other 3D format. The 3D content may correspond to a 3D visualization of one or more objects or scenes, or a 3D animation or video with a sequence of frames that capture changes occurring to the one or more 3D objects or 3D scenes over a period of time. In some embodiments, the 3D animation or video may correspond to a virtual reality, mixed reality, or augmented reality presentation in which the 3D objects or 3D scenes are positioned and/or moved in a virtual space or a real-world view, and the user field-of-view may change depending on where the user looks in that virtual space or real-world view.

Process 600 includes generating (at 604) a tree that partitions the 3D space of the 3D content into different sized regions and that stores or associates the primitives or 3D data within each of the different sized regions in different nodes and different layers of the tree. The nodes of the tree may be associated with time values when the tree is used to represent a 3D animation or video. For instance, generating (at 604) the tree for a 3D animation may include defining nodes for a first frame of the animation and nodes or branches with time values for changes occurring in different regions of the 3D space at different frames of the 3D animation, and defining a manifest that lists the indices for the nodes that contain the 3D data for each frame of the 3D animation.

In some embodiments, the 3D space of the particular 3D content is partitioned into equal but smaller sized regions for each lower layer of the tree. Specifically, the region spanned by each lower layer node of the tree is smaller than the region spanned by each node in a higher layer of the tree. Each node is defined to include the data for the primitives that are positioned in the region of that node. In some embodiments, the leaf nodes are defined with the primitive data and the higher layer nodes contain pointers or references to two or more leaf nodes that contain the primitive data for larger regions spanned by the higher layer nodes.

In some other embodiments, the 3D space of the particular 3D content is partitioned so that the region spanned by each node in each layer does not contain more than a threshold amount of primitive data defined for that layer. For instance, 3D streaming system 100 may generate (at 604) the leaf nodes to span regions that do not include more than 500 kilobytes of data or 5 primitives, and may generate (at 604) the parent nodes at the layer directly above the leaf nodes to span regions that do not include more than 1 megabyte of data or 10 primitives.

Process 600 includes defining the metadata (at 606) for the tree. The metadata may specify the structure of the tree without the data associated with each tree node. For instance, the metadata may identify the nodes at each level of the tree based on their unique identifiers, links between the nodes, and/or the region spanned by each tree node in the 3D space of the 3D content. The spanned region may be identified by coordinates for a volume in the 3D space of the 3D content, or by values that map to different partitioned volumes in the 3D space of the 3D content.

Process 600 includes compressing (at 608) nodes at one or more layers of the tree into compressed files that collectively include all the 3D content data. 3D streaming system 100 may generate the compressed files by selecting one or more leaf nodes or a higher layer node that encompasses one or more regions with up to a maximum or threshold amount of data. For instance, 3D streaming system 100 may select one or more leaf nodes that collectively contain primitive data that does not exceed 1 megabyte, or may select the parent node that directly or indirectly links to the one or more leaf nodes that collectively contain primitive data that does not exceed 1 megabyte. The optimal amount of data to compress is determined based on network performance, the streaming protocol, and/or resources of 3D streaming system 100 and the receiving client devices. In some embodiments, 3D streaming system 100 may transmit the same amount of data to the client devices in less time using more smaller compressed files. In some other embodiments, 3D streaming system 100 may transmit the same amount of data to the client devices in less time using fewer larger compressed files. Each compressed file is associated with or is identified by an identifier that corresponds to the region of space spanned by the nodes encoded within that compressed file.

Process 600 includes receiving (at 610) a request to access the 3D content from 3D streaming system 100. In some embodiments, the request may be an initial request to access the 3D content library of 3D streaming system 100. In some such embodiments, 3D streaming system 100 may provide the requesting client device with low resolution preview images and/or descriptions of available 3D content. The client device may present the preview images and/or descriptions in a user interface, and receive a user selection to access the 3D content. In some other embodiments, the request directly identifies the 3D content.

Process 600 includes transmitting (at 612) the particular 3D content metadata and/or manifest to the requesting client device. The metadata provides the requesting client device with the structure of the 3D content including a mapping between the node indices and the partitioned regions of the 3D content space. The manifest lists the nodes that contain the data at different regions for different frames of a 3D animation.

Process 600 includes receiving (at 614) a request from the requesting client device for a current field-of-view in the 3D content. The current field-of-view may be defined with coordinates for a near plane and/or a far plane or with the identifiers for the nodes that span the current field-of-view. In some embodiments, the current field-of-view is pre- defined in the 3D content metadata so that the 3D content is presented with the same default field-of-view when first accessed.

Process 600 includes streaming (at 616) the compressed files that were generated for the nodes containing the primitive data and/or spanning the regions in the current field-of-view to the requesting client device. 3D streaming system 100 may perform a mapping between the current field-of-view to the partitioned regions of the 3D content, and may identify the compressed files that encode the primitive data for the nodes that form the current field-of-view based on the mapping. In some embodiments, 3D streaming system 100 streams (at 616) a first set of compressed files for a default field-of-view to the requesting client device with the metadata and/or manifest.

Process 600 includes receiving (at 618) a request for an updated field-of-view. The updated field-of-view may correspond to a new position from which to render the 3D content and/or a request for changes that occur in the same field-of-view in different frames of a 3D animation.

Process 600 includes streaming (at 620) the compressed files that were generated for the nodes containing the primitive data and/or spanning the regions of the updated field-of-view. In some embodiments, 3D streaming system 100 streams (at 620) the compressed files for new nodes of the updated field-of-view that were not part of any previous fields-of-view and that were not previously streamed to the client device. 3D streaming system 100 continues the selective streaming of the compressed files to provide the client device with real-time access to different parts of the 3D content without unnecessarily transmitting the entirety of the 3D content to the client device.

3D streaming system 100 may further optimize the streaming of the compressed files by interleaving or adjusting the sequence with which the compressed files are sent to the client device. For instance, 3D streaming system 100 identifies the compressed files that are requested for a current field-of-view. Rather than stream the compressed files in order, 3D streaming system 100 may analyze the size of each compressed file, network quality (e.g., bandwidth quality), device resources, and/or other factors, and change the order with which the compressed files are sent to maximize the available bandwidth.

Figure 7:
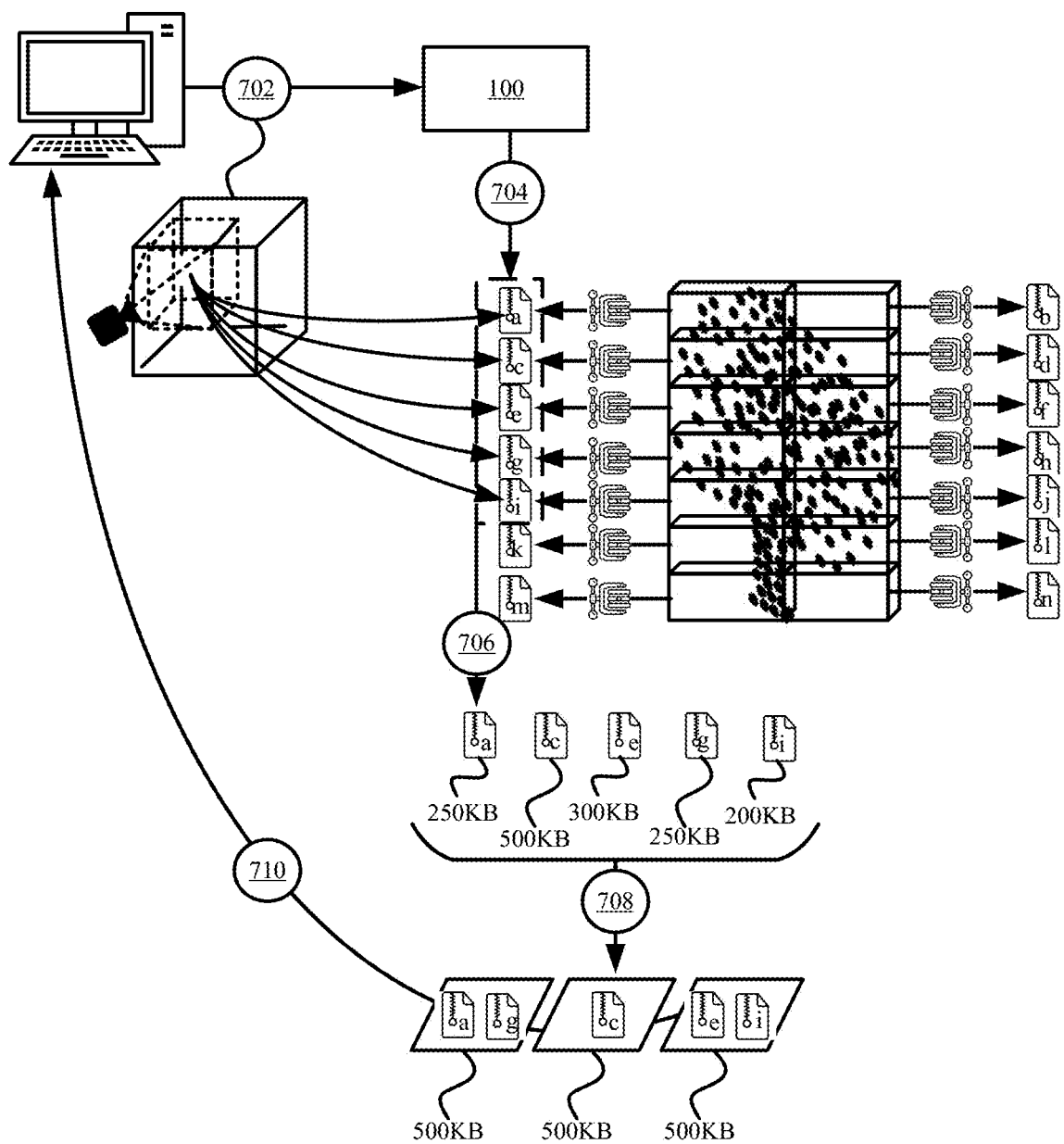
FIG. 7 illustrates an example of interleaving the transmission of compressed files for a current field-of-view in accordance with some embodiments presented herein.

FIG. 7 illustrates an example of interleaving the transmission of compressed files for a current field-of-view in accordance with some embodiments presented herein. 3D streaming system 100 receives (at 702) a request for a particular field-of-view, and selects (at 704) the compressed files that were generated for the nodes containing the primitive data and/or spanning the regions of the particular field-of-view.

3D streaming system 100 inspects (at 706) the sizes of the selected compressed files, and determines the optimal transmission sequence for the different sized compressed files. The optimal transmission sequence may be determined in part based on the amount of data that may be transmitted with a single data packet. The amount of data transmitted with a single data packet may be based on a MTU or payload size, may vary based on the streaming protocol being used, and/or may vary based on the type of connection between 3D streaming system 100 and the requesting client device (e.g., a wired broadband connection, a wireless Fifth Generation (5G) connection, a Bluetooth connection, etc.).

In some other embodiments, 3D streaming system 100 inspects the bandwidth quality and/or resource availability of 3D streaming system 100 and/or the requesting client device, and determines the optimal transmission sequence for the different sized compressed files based on the bandwidth quality and/or resource availability. For instance, 3D streaming system 100 may periodically measure (e.g., every 10 seconds) the available bandwidth or performance of the network path connecting 3D streaming system 100 to the requesting client device. In some such embodiments, the optimal transmission sequence may include prioritizing the transmission of smaller sized compressed files over larger sized compressed files when the bandwidth quality is low and prioritizing the transmission of larger sized compressed file when the bandwidth quality is high. Alternatively, 3D streaming system 100 may prioritize the transmission of larger sized compressed files over smaller sized compressed files when the bandwidth quality is low and may prioritize the transmission of smaller sized compressed files when the bandwidth quality is high.

3D streaming system 100 modifies (at 708) the order with which the selected compressed files are streamed to the client device based on the determined optimal transmission sequence and/or the determined amount of data that may be transmitted with a single data packet. For instance, 3D streaming system 100 and the client device may support receiving packets that are up to 500 Kilobytes in size. 3D streaming system 100 rearranges the sequence with which the selected compressed files are sent to the client device to minimize unnecessary padding or empty payloads in the packets. In other words, 3D streaming system 100 interleaves the distribution of the compressed files to generate an distribution ordering that minimizes the time to stream the selected compressed files to the requesting client device. 3D streaming system 100 streams (at 710) the compressed files to the client device according to the modified (at 708) order.

Figure 8:
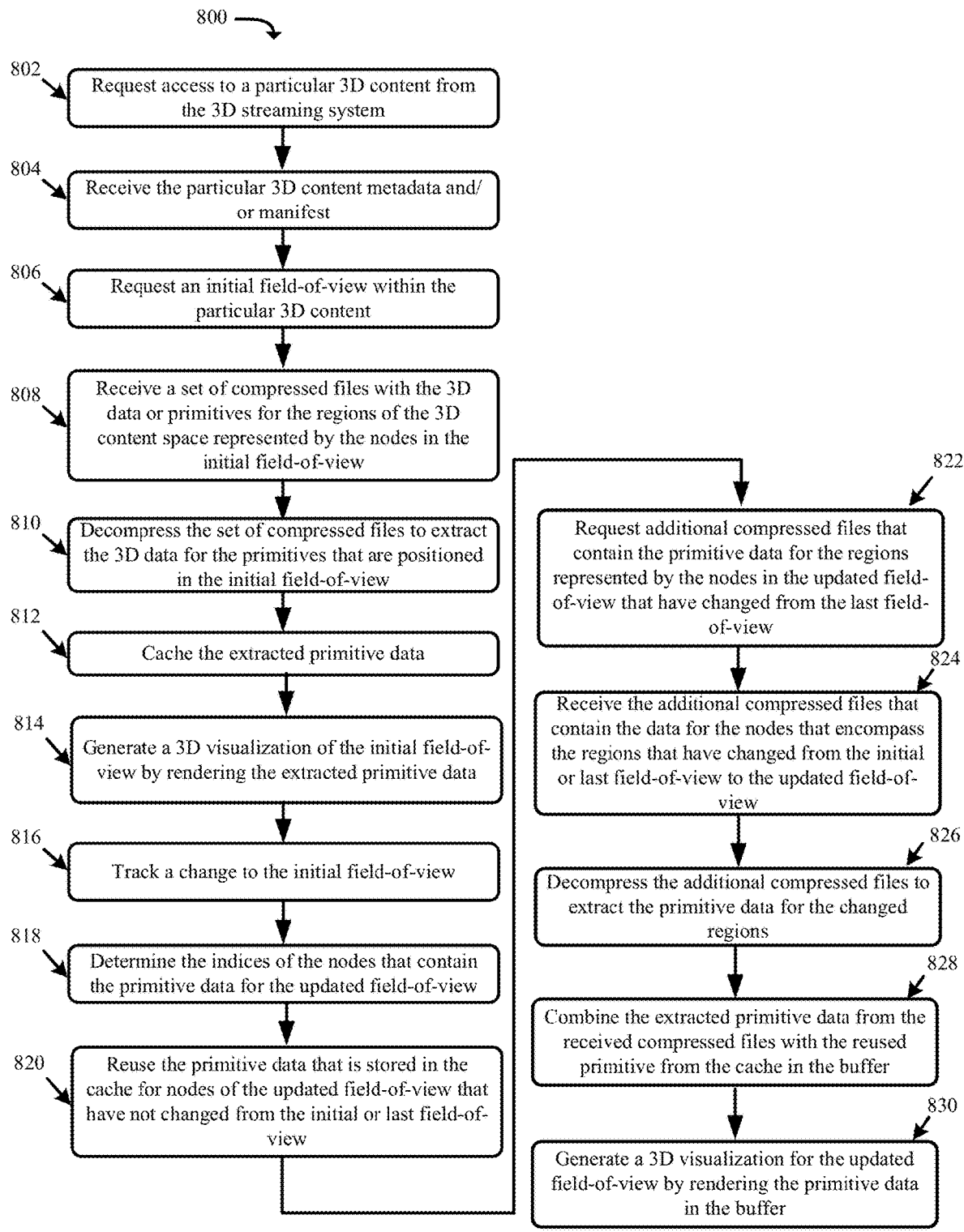
FIG. 8 presents a process for rendering 3D visualizations based on the streamed compressed files in accordance with some embodiments presented herein.

FIG. 8 presents a process 800 for rendering 3D visualizations based on the streamed compressed files in accordance with some embodiments presented herein. Process 800 is implemented by a client device that remotely accesses the 3D content hosted by 3D streaming system 100 via a data network. The client device may include a desktop computer, laptop computer, tablet, smartphone, or other network-enabled device that is used for interacting with, playing, editing, and/or otherwise viewing 3D content including static 3D objects, static 3D scenes, 3D animations, 3D videos, virtual reality experiences, mixed reality experiences, and/or augmented reality experiences.

Process 800 includes requesting (at 802) access to a particular 3D content. The client device issues the request to 3D streaming system 100 using a URL, link, or other identifier that identifies the particular 3D content. Process 800 includes receiving (at 804) the particular 3D content metadata and/or manifest if the particular 3D content includes a 3D animation.

Process 800 includes requesting (at 806) an initial field-of-view within the particular 3D content. The initial field-of-view may be defined from a position and orientation of a virtual camera in the 3D space of the particular 3D content. In some embodiments, the metadata specifies an initial or default position and orientation for the virtual camera, and the request for the initial field-of-view may include that initial or default position and orientation. In some other embodiments, the client device analyzes the metadata or the tree structure provided as part of the metadata. For instance, the client device maps different nodes of the tree structure to the different regions of the particular 3D content, and selects a set of nodes to request first. The selected set of nodes may include nodes at the center of the 3D content space or nodes that represent foreground and central regions of the 3D content. In some such embodiments, requesting (at 806) the initial field-of-view includes requesting the indices associated with the selected set of nodes that contain or are associated with the 3D data for the initial field-of-view. Process 800 includes receiving (at 808) a set of compressed files with the 3D data or primitives for the regions of the 3D content space represented by the nodes in the initial field-of-view. Process includes 800 decompressing (at 810) the set of compressed files to extract the 3D data for the primitives that are positioned in the initial field-of-view and/or that are within the partitioned regions of the set of nodes compressed to the set of compressed files.

Process 800 includes caching (at 812) the extracted primitive data. Caching (at 812) the extracted primitive data may include partially constructing the tree-based representation of the particular 3D content at the client device by populating one or more nodes of the empty tree structure, that is provided as the metadata, with the extracted primitive data that is positioned in the regions spanned by the one or more nodes.

Process 800 includes generating (at 814) a 3D visualization of the initial field-of-view. The client device generates (at 814) the 3D visualization by rendering the extracted primitive data.

Process 800 includes tracking (at 816) a change to the initial field-of-view. The client device may track (at 816) the changes based on user input that moves the virtual camera position and/or orientation in the 3D content space. The client device may also track (at 816) the changes based on the received manifest for a 3D animation, wherein the received manifest lists nodes within the current field-of-view that change from a current frame of the 3D animation to a next frame.

Process 800 includes determining (at 818) the indices of the nodes that contain the primitive data for the updated field-of-view. In response to the virtual camera position and/or orientation moving to present one or more new regions of the 3D content, the client device references the metadata and/or tree structure to determine the indices of the nodes that contain the primitive data for the one or more new regions. In response to the field-of-view changing because of changes occurring between different frames of a 3D animation, the client device references the manifest to determine the indices of the nodes that contain the primitive data for the one or more regions in the updated field-of-view that change from the current frame to the next frame of the animation.

Process 800 includes reusing (at 820) the primitive data that is stored in the cache for nodes of the updated field-of-view that have not changed from the initial or last field-of-view. Specifically, the client device may move or retain the reused primitive data in a buffer.

Process 800 includes requesting (at 822) additional compressed files that contain the primitive data for the regions represented by the nodes in the updated field-of-view that have changed from the last field-of-view. The client device may request fewer nodes or compressed files than for the initial field-of-view since some of the cached primitive data retrieved for the initial field-of-view may be reused provided that the updated field-of-view is not entirely different than the initial field-of-view.

Process 800 includes receiving (at 824) the additional compressed files that contain the data for the nodes that encompass the regions that have changed from the initial or last field-of-view to the updated field-of-view. Process 800 includes decompressing (at 826) the additional compressed files to extract the primitive data for the changed regions.

Process 800 includes combining (at 828) the extracted primitive data from the received (at 824) compressed files with the reused primitive from the cache in the buffer. Process 800 includes generating (at 830) a 3D visualization for the updated field-of-view by rendering the primitive data in the buffer.

Figure 9:
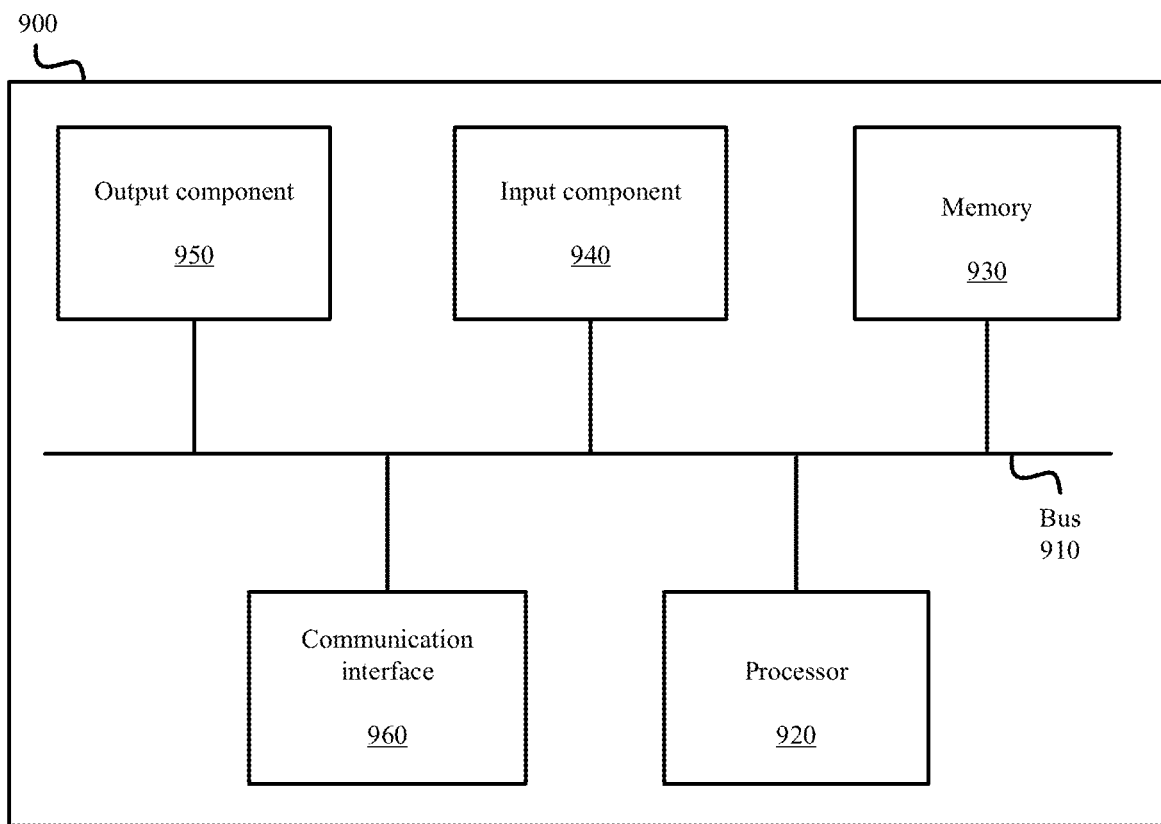
FIG. 9 illustrates example components of one or more devices, according to one or more embodiments described herein.

FIG. 9 is a diagram of example components of device 900. Device 900 may be used to implement one or more of the tools, devices, or systems described above (e.g., 3D streaming system 100 or the client devices). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
receiving a three-dimensional (3D) animation that defines a plurality of 3D data distributed across a 3D space at different times of the 3D animation;
partitioning the 3D space into a plurality of regions;
generating a plurality of compressed files by compressing a different subset of 3D data from the plurality of 3D data that is within one or more different regions of the plurality of regions at a different time of the 3D animation as a separate compressed file of the plurality of compressed files based on the amount of 3D data contained in the one or more different regions;
associating each compressed file of the plurality of compressed files with an identifier and a time element, wherein the identifier of a particular compressed file identifies the one or more regions represented by the particular compressed file, and wherein the time element of the particular compressed file specifies the different time of the 3D animation at which the different subset of 3D data in the one or more regions represented by the particular compressed file is presented in the 3D animation;
receiving a request for a first region, a second region, and a third region of the plurality of regions that form all or part of a particular field-of-view in the 3D space at a first time in the 3D animation; and
streaming a set of compressed files from the plurality of compressed files that contain the different subset of 3D data for the first, second, and third regions within the particular field-of-view at the first time in the 3D animation, wherein streaming the set of compressed files comprises:
streaming a first compressed file with the different subset of 3D data for the first region and with the time element associated with the first compressed file corresponding to the first time that is specified in the request for the 3D animation; and
streaming a second compressed file with the different subset of 3D data for the second region and the different subset of 3D data for the third region and with the time element associated with the second compressed file corresponding to the first time that is specified in the request for the 3D animation.

2. The method of claim 1 further comprising:
determining that the particular field-of-view spans the 3D space encompassed by the first, second, and third regions;
selecting, in response to the request, a first set of compressed files from the plurality of compressed files that were generated from compressing the different subset of 3D data in the first, second, and third regions at the different times of the 3D animation; and
filtering the first set of compressed files to a second set of compressed files by retaining the set of compressed files from the first set of compressed files with the time element being associated with the first time requested for the particular field-of-view and by excluding one or more compressed files in the first set of compressed files from the second set of compressed files with the time element being associated with a different time of the 3D animation than the first time.

3. The method of claim 1 further comprising:
generating a tree-based representation for the 3D space of the 3D animation, wherein the tree-based representation comprises a plurality of nodes at different layers that map to different sized regions in the 3D space.

4. The method of claim 3, wherein generating the tree-based representation comprises:
defining each node of the plurality of nodes with an index that corresponds to a different region of the plurality of regions and a time at which the node applies to the 3D animation.

5. The method of claim 3 further comprising:
receiving a request to access the 3D animation prior to receiving the request for the particular field-of-view;
providing the tree-based representation in response to the request to access the 3D animation; and
wherein receiving the request for the particular field-of-view comprises receiving indices of a set of nodes from the plurality of nodes that map to the first, second, and third regions and a value for the first time.

6. The method of claim 5, wherein streaming the set of compressed files comprises:
selecting the first compressed file from a node at a first level in the tree-based representation and the second compressed file from a node at a different second level in the tree-based representation based on the indices of the set of nodes.

7. The method of claim 1 further comprising:
mapping each region of the plurality of regions to a different node from a plurality of nodes of a tree-based representation of the 3D space; and
wherein generating the plurality of compressed files comprises:
associating a common identifier to a particular compressed file that contains the different subset of 3D data in a particular region of the 3D space and to a particular node of the plurality of nodes that maps to the particular region.

8. The method of claim 7, wherein receiving the request comprises:
receiving the common identifier as part of the request; and
selecting the particular compressed file.

9. The method of claim 1,
wherein partitioning the 3D space comprises:
defining each region of the plurality of regions to span an equal sized volume of the 3D space;
wherein generating the plurality of compressed files comprises:
defining each file of the plurality of compressed files with the different subset of 3D data from one or more neighboring regions until a total amount of 3D amount within the one or more neighboring regions is no more than a threshold amount of the plurality of 3D data.

10. The method of claim 1, wherein partitioning the 3D space comprises:
selecting each region of the plurality of regions so that the different subset of 3D data associated with each region that is selected does not exceed a threshold amount of 3D data.

11. The method of claim 1,
wherein the plurality of 3D data comprises a plurality of points of a point cloud that are disconnected from one another and that are each defined with a position in the 3D space and visual characteristics for the position in the 3D space; and
wherein generating the plurality of compressed files comprises:
encoding the first compressed file with the position and the visual characteristics of two more points from the plurality of points that are defined in the first region for the first time of the 3D animation, wherein the first compressed file contains all positional and color data contained in the first region for the first time of the 3D animation.

12. The method of claim 1 further comprising:
receiving a request for an updated field-of-view with one or more regions that are not within the particular field-of-view;
selecting a second set of compressed files from the plurality of compressed files that contain the different subset of 3D data that is within each region of the one or more regions; and
streaming the second set of compressed files in response to the request for the updated field-of-view.

13. The method of claim 1, wherein a given compressed file from the set of compressed files comprises:
coordinates of two or more point cloud points that are defined in the region of the 3D space spanned by the given compressed file; and
color values for the two or more point cloud points, wherein the coordinates and the color values of the given compressed file comprise all data for rendering a visualization of the region spanned by the given compressed file.

14. The method of claim 1 further comprising:
receiving a request for the first, second, and third regions of the particular field-of-view in the 3D space at a second time that is after the first time in the 3D animation;
determining that the different subset of 3D data associated with the first region and the different subset of 3D data associated with the second region do not change from the first time to the second time;
determining that the different subset of 3D data associated with the third region changes from the first time to the second time; and
streaming a third compressed file without any compressed files for the first and second regions in response to the request for the particular field-of-view at the second time, wherein the third compressed file comprises 3D data that has changed in the third region from the first time to the second time.

15. The method of claim 1 further comprising:
determining that the different subset of 3D data associated with the first region and the different subset of 3D data associated with the second region do not change from the first time to a second time that is after the first time in the 3D animation;
determining that the different subset of 3D data associated with the third region changes from the first time to the second time;
generating a manifest that lists the first compressed file for the first region at the first time and the second time, the second compressed file for the second region at the first time and the second time, the second compressed file for the third region at the first time, and a third compressed file for the third region at the second time; and
streaming the manifest in response to a request to access the 3D animation prior to receiving the request for the particular field-of-view.

16. The method of claim 1 further comprising:
receiving a request for the first, second, and third regions of the particular field-of-view in the 3D space at a second time that is after the first time in the 3D animation;
determining that no compressed file is defined for the first region or the second region at the second time and that a third compressed file is defined for the third region at the second time; and
streaming the third compressed file in response to the request for the particular field-of-view in the 3D space at the second time.

17. A three-dimensional (3D) streaming system comprising:
one or more hardware processors configured to:
receive a 3D animation that defines a plurality of 3D data distributed across a 3D space at different times of the 3D animation;
partition the 3D space into a plurality of regions;
generate a plurality of compressed files by compressing a different subset of 3D data from the plurality of 3D data that is within one or more different regions of the plurality of regions at a different time of the 3D animation as a separate compressed file of the plurality of compressed files based on the amount of 3D data contained in the one or more different regions;
associate each compressed file of the plurality of compressed files with an identifier and a time element, wherein the identifier of a particular compressed file identifies the one or more regions represented by the particular compressed file, and wherein the time element of the particular compressed file specifies the different time of the 3D animation at which the different subset of 3D data in the one or more regions represented by the particular compressed file is presented in the 3D animation;
receive a request for a first region, a second region, and a third region of the plurality of regions that form all or part of a particular field-of-view in the 3D space at a first time in the 3D animation; and
stream a set of compressed files from the plurality of compressed files that contain the different subset of 3D data for the first, second, and third regions within the particular field-of-view at the first time in the 3D animation, wherein streaming the set of compressed files comprises:
streaming a first compressed file with the different subset of 3D data for the first region and with the time element associated with the first compressed file corresponding to the first time that is specified in the request for the 3D animation; and
streaming a second compressed file with the different subset of 3D data for the second region and the different subset of 3D data for the third region and with the time element associated with the second compressed file corresponding to the first time that is specified in the request for the 3D animation.

18. The 3D streaming system of claim 17, wherein the one or more hardware processors are further configured to:

determine that the particular field-of-view spans the 3D space encompassed by the first, second, and third regions;

select, in response to the request, a first set of compressed files from the plurality of compressed files that were generated from compressing the different subset of 3D data in the first, second, and third regions at the different times of the 3D animation; and filter the first set of compressed files to a second set of compressed files by retaining the set of compressed files from the first set of compressed files with the time element being associated with the first time requested for the particular field-of-view and by excluding one or more compressed files in the first set of compressed files from the second set of compressed files with the time elements being associated with a different time of the 3D animation than the first time.

19. The 3D streaming system of claim 17, wherein the one or more hardware processors are further configured to:

generate a tree-based representation for the 3D space of the 3D animation, wherein the tree-based representation comprises a plurality of nodes at different layers that map to different sized regions in the 3D space.

20. A non-transitory computer-readable medium storing instructions that, when executed by one or more processors of a three-dimensional (3D) streaming system, cause the 3D streaming system to perform operations comprising:

receiving a 3D animation that defines a plurality of 3D data distributed across a 3D space at different times of the 3D animation;

partitioning the 3D space into a plurality of regions;

generating a plurality of compressed files by compressing a different subset of 3D data from the plurality of 3D data that is within one or more different regions of the plurality of regions at a different time of the 3D animation as a separate compressed file of the plurality of compressed files based on the amount of 3D data contained in the one or more different regions;

associate each compressed file of the plurality of compressed files with an identifier and a time element, wherein the identifier of a particular compressed file identifies the one or more regions represented by the particular compressed file, and wherein the time element of the particular compressed file specifies the different time of the 3D animation at which the different subset of 3D data in the one or more regions represented by the particular compressed file is presented in the 3D animation;

receiving a request for a first region, a second region, and a third region of the plurality of regions that form all or part of a particular field-of-view in the 3D space at a first time in the 3D animation; and streaming a set of compressed files from the plurality of compressed files that contain the different subset of 3D data for the first, second, and third regions within the particular field-of-view at the first time in the 3D animation, wherein streaming the set of compressed files comprises:

streaming a first compressed file with the different subset of 3D data for the first region and with the time element associated with the first compressed file corresponding to the first time that is specified in the request for the 3D animation; and streaming a second compressed file with the different subset of 3D data for the second region and the different subset of 3D data for the third region and with the time element associated with the second compressed file corresponding to the first time that is specified in the request for the 3D animation.

\* \* \* \* \*